United States Patent [19]

Hughes, Jr.

[11] Patent Number: 5,226,283
[45] Date of Patent: Jul. 13, 1993

[54] LAWN MOWING APPARATUS

[76] Inventor: James C. Hughes, Jr., Rt. 2, Box 681, Harrisburg, Ill. 62946

[21] Appl. No.: 824,374

[22] Filed: Jan. 23, 1992

[51] Int. Cl.$^5$ .............................................. A01D 34/86
[52] U.S. Cl. ........................................ 56/6; 56/13.6; 56/15.6; 56/DIG. 9
[58] Field of Search ................. 56/6, 13.6, 15.6, 15.9, 56/DIG. 3, DIG. 9, DIG. 10

[56] References Cited
U.S. PATENT DOCUMENTS

| | | | |
|---|---|---|---|
| 2,982,080 | 5/1961 | Martin | 56/6 |
| 3,023,561 | 3/1962 | Gustafson | 56/13.6 |
| 4,854,112 | 8/1989 | Holley et al. | 56/6 |
| 4,949,534 | 8/1990 | Evans | 56/6 |

Primary Examiner—Terry Lee Melius
Attorney, Agent, or Firm—Leon Gilden

[57] ABSTRACT

A first lawn mowing vehicle formed of self-propelled configuration mounts a second lawn mowing vehicle utilizing a frame assembly. The frame assembly is pivotally mounted to the first lawn mowing vehicle and to the second lawn mowing vehicle, with the second lawn mowing vehicle projecting through a housing receiving opening in the frame assembly, with the frame assembly rear distal end pivotally mounted to a first vehicle frame plate fixedly mounted to the first vehicle between forward and rear wheels of the first vehicle. A throttle cable is directed from the second vehicle to the first vehicle and mounted to a pivot handle secured to a support post adjacent the first vehicle frame plate.

5 Claims, 6 Drawing Sheets

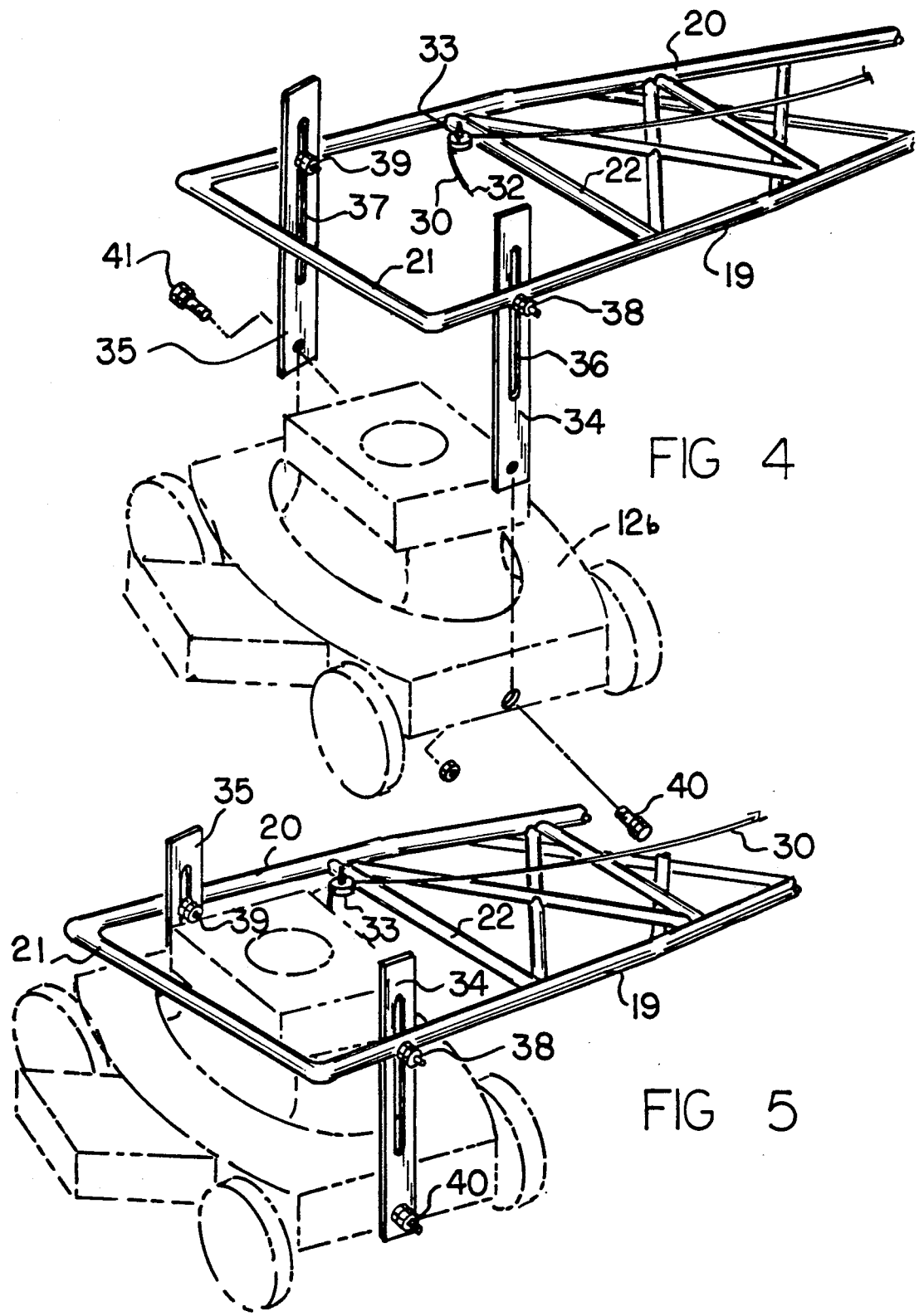

LAWN MOWING APPARATUS

BACKGROUND OF THE INVENTION

1. Field of the Invention

The field of the invention relates to lawn mowing apparatus, and more particularly pertains to a new and improved lawn mowing apparatus wherein the same is arranged for the remote and pivotal mounting of a second lawn mowing vehicle relative to the first lawn mowing vehicle accommodating various hillsides and geographical differences between the first vehicle and the second vehicle.

2. Description of the Prior Art

In the lawn mowing of hillsides and the like utilizing a self-propelled vehicle, danger of tipping and its associated hazards relative to individuals is ever-present. The instant invention attempts to overcome deficiencies of the prior art by mounting a second lawn mowing vehicle relative to a first lawn mowing vehicle utilizing a frame assembly pivotally interconnecting he two vehicles. Prior art structure arranged for the mowing of hillsides is exemplified in the U.S. Pat. No. 4,426,829 to Johnson setting for a grass and ditch mower wherein a floating deck is mounted to an extension arm mounted to a first vehicle.

The U.S. Pat. No. 4,869,054 to Hostetler, et al. sets forth a lawn mower with side frames arranged to accommodate variations in terrain in cutting.

Similarly, the U.S. Pat. No. 4,707,971 to Forpahl, et al. sets forth the further use of lawn mowing decks mounted laterally of a central vehicle.

U.S. Pat. No. 4,955,187 to Van Der Lely sets forth a mowing machine extending laterally from a tractor utilizing a plurality of pulleys to operate cutting blades therefrom.

As such, it may be appreciated that there continues to be a need for a new and improved lawn mowing apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of lawn mowing apparatus now present in the prior art, the present invention provides a lawn mowing apparatus wherein the same utilizes a pivoting framework arranged to mount a first lawn mowing vehicle relative to a second lawn mowing vehicle. As such, the general purpose of the present invention, which will be described subsequently in greater detail, is to provide a new and improved lawn mowing apparatus which has all the advantages of the prior art lawn mowing apparatus and none of the disadvantages.

To attain this, the present invention provides a first lawn mowing vehicle formed of self-propelled configuration mounting a second lawn mowing vehicle utilizing a frame assembly. The frame assembly is pivotally mounted to the first lawn mowing vehicle and to the second lawn mowing vehicle, with the second lawn mowing vehicle projecting through a housing receiving opening in the frame assembly, with the frame assembly rear distal end pivotally mounted to a first vehicle frame plate fixedly mounted to the first vehicle between forward and rear wheels of the first vehicle. A throttle cable is directed from the second vehicle to the first vehicle and mounted to a pivot handle secured to a support post adjacent the first vehicle frame plate.

My invention resides not in any one f these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn mowing apparatus which has all the advantages of the prior art lawn mowing apparatus and none of the disadvantages.

It is another object of the present invention to provide a new and improved lawn mowing apparatus which may be easily and efficiently manufactured and marketed.

It is a further object of the present invention to provide a new and improved lawn mowing apparatus which is of a durable and reliable construction.

An even further object of the present invention is to provide a new and improved lawn mowing apparatus which is susceptible of a low cost of manufacture with regard to both materials and labor, and which accordingly is then susceptible of low prices of sale to the consuming public, thereby making such lawn mowing apparatus economically available to the buying public.

Still yet another object of the present invention is to provide a new and improved lawn mowing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of the second lawn mowing vehicle mounted to a forward distal end of the frame assembly.

FIG. 5 is an isometric illustration of the second lawn mowing vehicle in a swivel configuration relative to the frame assembly.

DESCRIPTION OF THE PREFERRED EMBODIMENT

Figure 1:
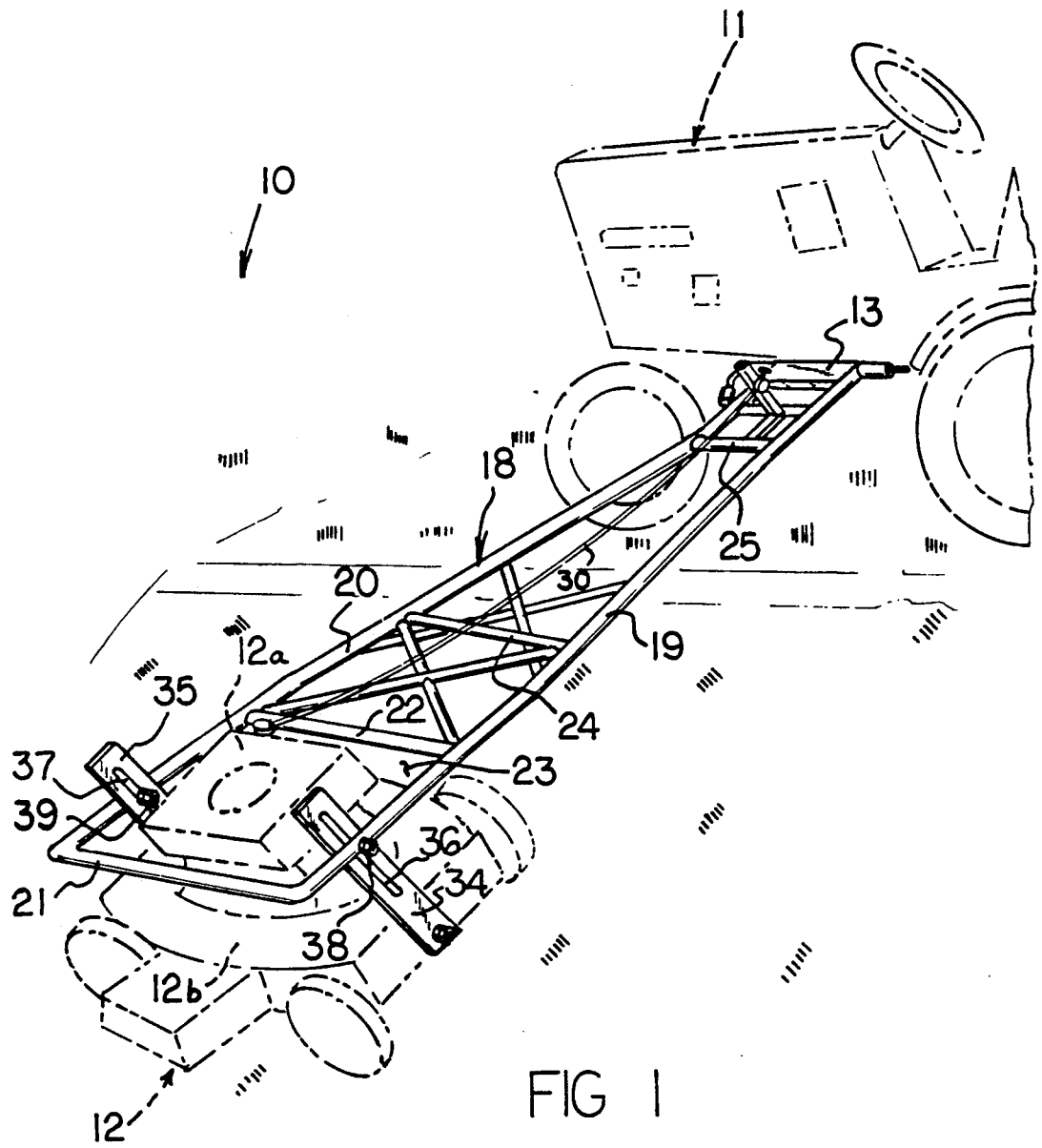
FIG. 1 is an isometric illustration of the instant invention.
Figure 2:
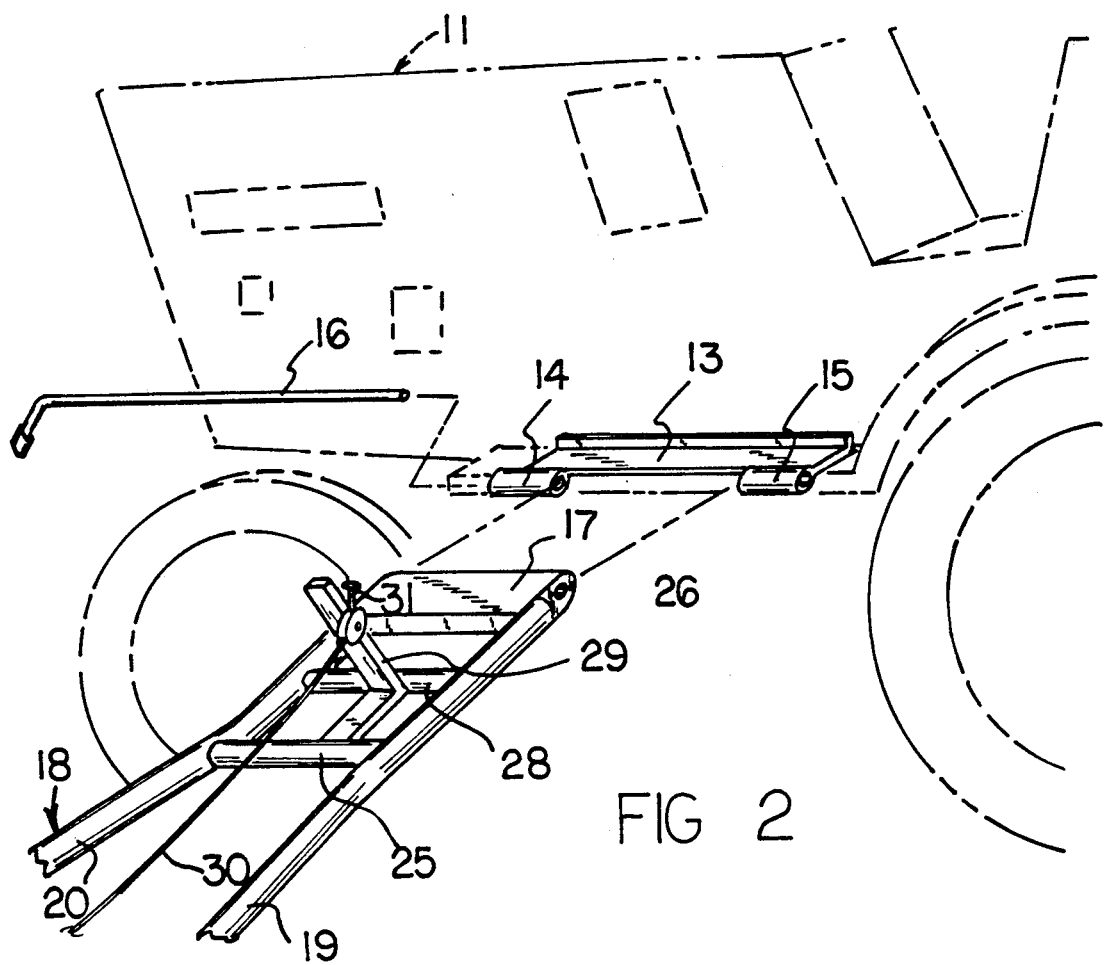
FIG. 2 is an isometric enlarged illustration of the frame assembly mounted to the first lawn mowing vehicle.
Figure 3:
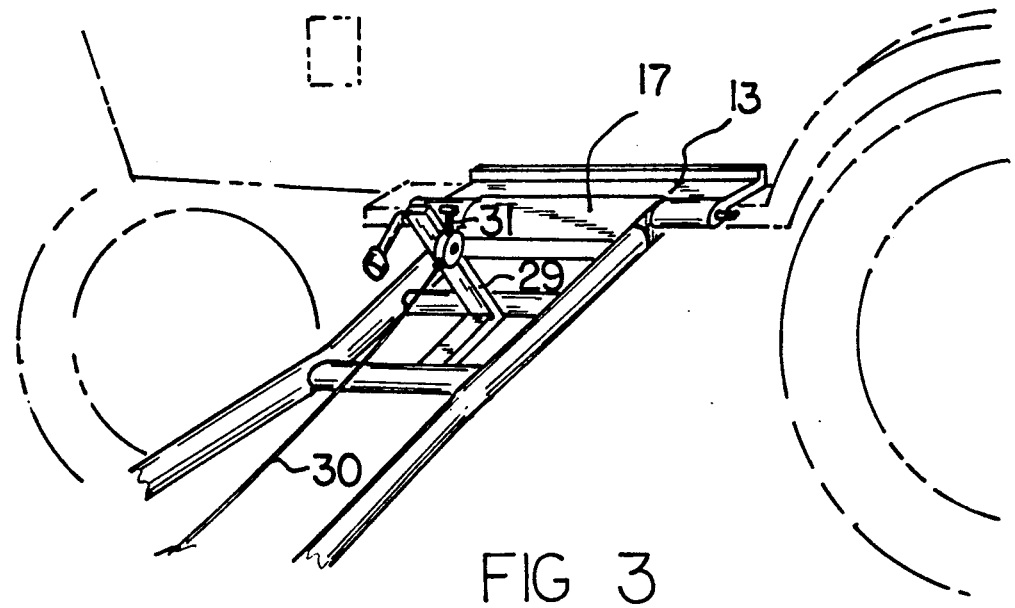
FIG. 3 is an isometric illustration of the frame assembly mounted to the first lawn mowing vehicle in an attached configuration.
Figures 6, 7:
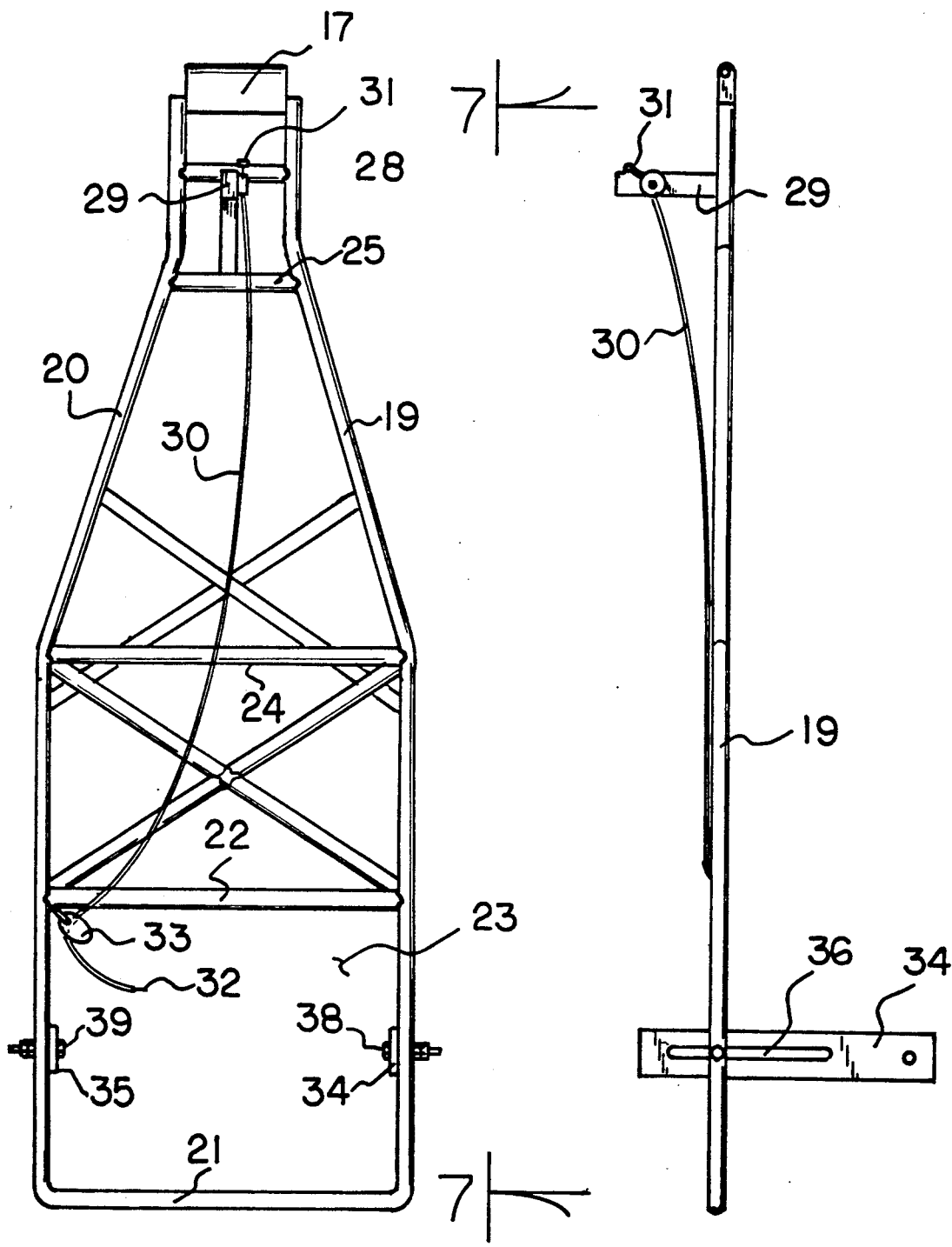
FIG. 6 is an orthographic top view of the frame assembly.
FIG. 7 is an orthographic side view of the frame assembly, taken along the lines 7—7 of FIG. 6 in the direction indicated by the arrows.

With reference now to the drawings, and in particular to FIGS. 1 to 10 thereof, a new and improved lawn mowing apparatus embodying the principles and concepts of the present invention and generally designated by the reference numeral 10 will be described.

More specifically, the lawn mowing apparatus 10, as depicted for example in FIG. 1, includes in combination a first lawn mower vehicle 11, typically of a self-propelled type in association with a second lawn mower vehicle 12 that is mounted to a frame assembly 18 that is pivotally mounted to the first and second lawn mower vehicles 11 and 12 permitting the second lawn mower vehicle 12 to accommodate various inclined surfaces to be mowed. The first vehicle 11 includes a first vehicle frame plate 13 fixedly mounted to the first vehicle between the forward and rear wheels of the first vehicle. The first vehicle frame plate 13 includes a first hinge tube 14 and a second hinge tube 15 that are coaxially aligned and integrally mounted to a forward edge of the frame plate 13. The first and second hinge tubes 14 and 15 are spaced apart a predetermined length. The frame assembly 18 includes a mounting flange 17. The mounting flange 17 includes a mounting flange tube directed therethrough that is arranged for coaxial alignment between the first and second hinge tubes 14 and 15, with a mounting flange tube 26 of a length equal to the predetermined length to interfit between the first and second hinge tubes 14 and 15. A hinge pin 16 directed through the first and second hinge tubes 14 and 15 and the mounting flange tube 26 mechanically and pivotally mounts the frame assembly 18 to the first vehicle 11. A first frame leg 19 and a second frame leg 20 extend laterally relative to the mounting flange 17 in a splayed relationship relative to one another, wherein the first and second frame legs 19 and 20 are coextensive relative to one another and substantially in coplanar alignment relative to each other. A first connecting leg 21 orthogonally connects forward distal ends of the first and second frame legs 19 and 20, with a second connecting leg 22 spaced in a parallel relationship between the first and second frame legs 19 and 20 defining a housing receiving opening 23 to receive a second lawn mower vehicle engine housing 12a therethrough. The engine housing 12a is mounted to the second vehicle mower deck 12b. The housing receiving opening 23 is accordingly defined by the first and second frame legs 19 and 20 and the parallel first and second connecting legs 21 and 22. To provide for structural integrity between the first and second frame legs, first and second cross brace members 24 and 25 are arranged parallel relative to each other and to the connecting legs 21 and 22 in integral communication between the frame legs. A third cross brace 28 is also provided and as illustrated in the FIG. 2 for example, includes a post 29 fixedly mounted thereto extending upwardly relative to the third cross brace 28 to mount a throttle cable sheath 30 thereto, with the cable sheath including a cable control level 31 pivotally mounted to the post 29 securing a first distal end of the throttle cable 32 slidably directed throughout the cable sheath 30, with a second distal end of the throttle cable 32 (note FIG. 4) directed to a throttle control portion of the second vehicle engine housing 12a. A pulley member 30 pivotally mounted at an intersection of the second frame leg 20 and the first connecting leg 21 directs the cable sheath in a desired angular orientation towards the engine housing 12a.

A first mounting plate 34 and a second mounting plate 35 are mounted to the respective first and second frame legs 19 and 20 between the first connecting leg 21 and the second connecting leg 22. The first and second mounting plates 34 and 35 respectively extend downwardly relative to the first and second frame legs, with respective first and second pivot axles 38 and 39 extending through respective first and second slots 36 and 37 within the respective first and second mounting plates 34 and 35. Adjacent lower distal ends of the first and second mounting plates 34 and 35 are respective first and second fasteners 40 and 41 to fixedly mount the first and second mounting plates 34 and 35 to respective first and second end walls of the mower deck 12b.

Figure 8:
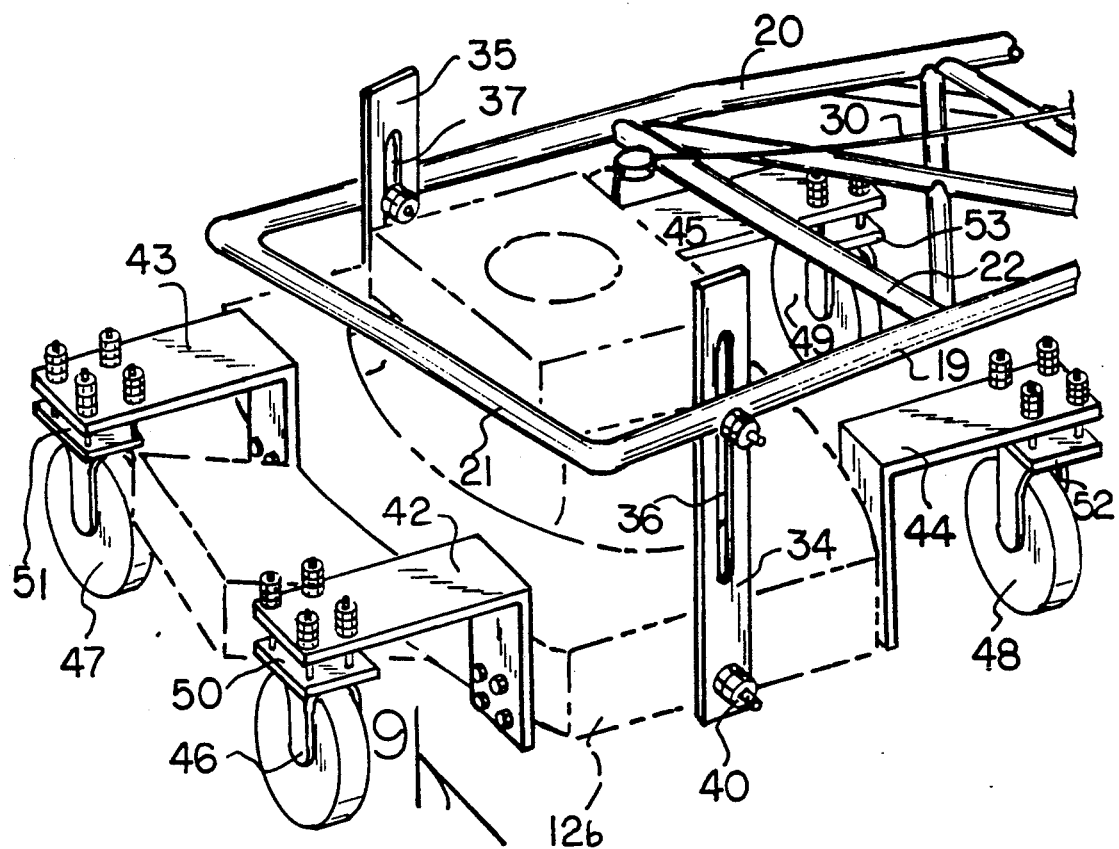
FIG. 8 is an isometric illustration of the invention utilizing laterally spaced castor wheels relative to the second lawn mowing vehicle.
Figure 9:
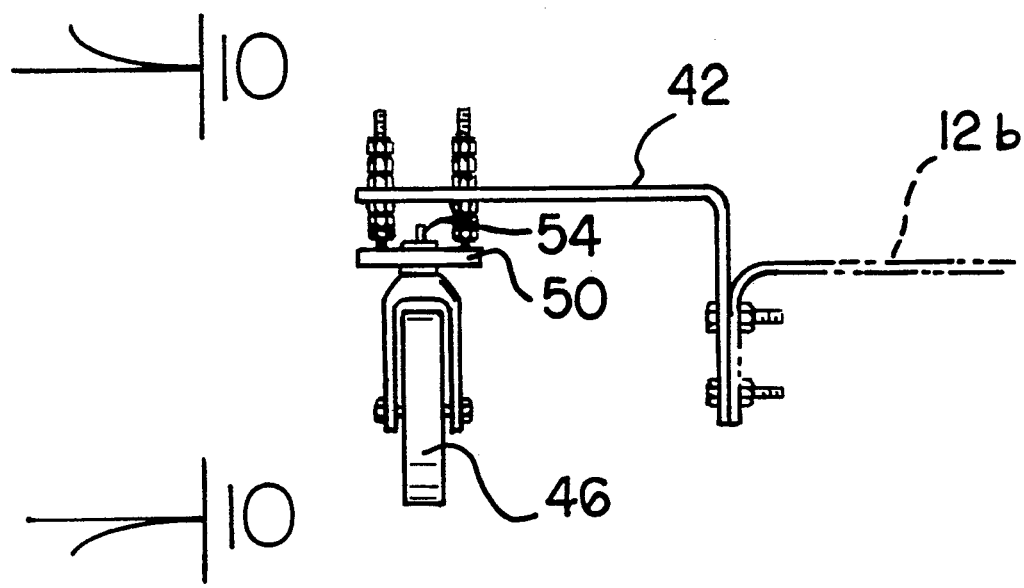
FIG. 9 is an orthographic view, taken along the lines 9—9 of FIG. 8 in the direction indicated by the arrows.
Figure 10:
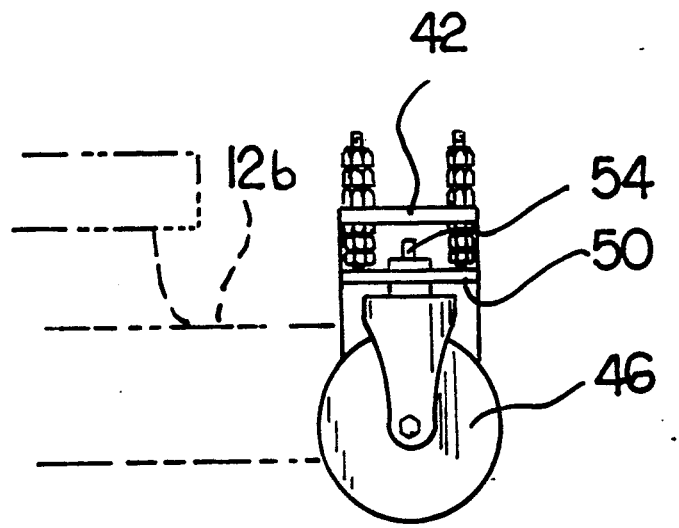
FIG. 10 is an orthographic view, taken along the lines 10—10 of FIG. 9 in the direction indicated by the arrows.

With reference to the FIGS. 8–10, the second vehicle mower deck 12b includes respective first and second mounting brackets 42 and 43 mounted respective first side wall of the deck 12b, with respective third and fourth mounting brackets 44 and 45 mounted to respective second side wall of the deck 12b. A respective first, second, third, and fourth castor wheel 46, 47, 48, and 49 respectively are mounted to the respective first, second, third, and fourth mounting brackets and more specifically to respective first, second, third, and fourth castor wheel mounting plates 50, 51, 52, and 53 that are spaced below the respective first, second, third, and fourth mounting brackets to provide clearance for a castor wheel pivot axle 54 extending medially through each mounting plate permitting total rotative pivotment of each castor wheel permitting the second vehicle 12 to more readily maneuver relative to any geographical terrain to be mowed in conjunction with the first vehicle 11.

As to the manner of usage and operation of the instant invention, the same should be apparent form the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A lawn mowing apparatus, comprising,
   a first lawn mower vehicle, the first lawn mower vehicle including at least one rear wheel and at least one forward wheel, the first vehicle including self-propelled motivation, and
   a second lawn mower vehicle, and
   a frame assembly means for pivotally mounting the second vehicle to the first vehicle, and
   the first vehicle includes a frame plate fixedly mounted to the first vehicle between said rear wheel and said forward wheel, wherein the frame plate includes a frame plate first hinge tube and a frame plate second hinge tube fixedly mounted to a forward edge of the first vehicle frame plate, wherein the first hinge tube and the second hinge tube are spaced apart a predetermined length, and the frame assembly means including a frame assembly rear distal end, wherein the frame assembly rear distal end includes a mounting flange, the mounting flange including a mounting flange tube, the mounting flange tube defined by a length equal to the predetermined length between the first hinge tube and the second hinge tube, and a hinge pin directed through the first hinge tube, the mounting flange tube, and the second hinge tube, and
   the frame assembly means further includes a first frame leg and a second frame leg arranged in a coplanar relationship fixedly mounted to the mounting flange, wherein the first frame leg and the second frame leg are arranged in a splayed relationship relative to one another and are each coextensive relative to one another, and a first connecting leg fixedly mounting the first frame leg to the second frame leg and a second connecting leg spaced from and parallel the first connecting leg, wherein the second connecting leg is fixedly mounted to the first frame leg and the second frame leg, and a housing receiving opening is defined within the first frame leg, the second frame leg, the first connecting leg, and the second connecting leg, and the second vehicle including a second vehicle engine housing and a second vehicle deck, wherein the second vehicle engine housing is mounted to the second vehicle deck, and the second vehicle engine housing is positioned within the housing receiving opening.

2. An apparatus as set forth in claim 1 including at least one cross brace fixedly mounted between a first frame leg and a second frame leg positioned between the mounting flange and the second connecting leg, wherein the cross brace includes a post fixedly mounted thereto, the post including a control lever pivotally mounted to the post, the control lever mounting a throttle cable and a throttle cable sheath, the throttle cable slidably mounted within the throttle cable sheath, and a pulley member mounted within the housing receiving opening adjacent an intersection of the second frame leg and the second connecting leg, with the throttle cable sheath directed about the pulley member, with the throttle cable arranged for securement to the second vehicle engine housing.

3. An apparatus as set forth in claim 2 including a first mounting plate fixedly mounted to the first frame leg extending downwardly therefrom within the housing receiving opening, and a second mounting plate mounted to the second frame leg extending downwardly therefrom within the housing receiving opening, wherein the first mounting plate includes a first slot and the second mounting plate includes a second slot, and a first pivot axle directed through the first frame leg and the first slot pivotally mounting the first mounting plate to the first frame leg, and a second pivot axle directed through the second frame leg and through the second slot pivotally mounting the second frame leg to the second mounting plate, the first mounting plate mounted to the second vehicle mower deck and the second mounting plate mounted fixedly to the second vehicle mower deck, including a first fastener fixedly mounting the first mounting plate to the second vehicle mower deck and a second fastener fixedly mounting the second mounting plate to the second vehicle mower deck.

4. An apparatus as set forth in claim 3 wherein the second vehicle mower deck includes a first side wall and a second side wall, wherein the first side wall includes a first mounting bracket and second mounting bracket, and the second side wall includes a third mounting bracket and a fourth mounting bracket, and a first castor wheel mounted to the first mounting bracket and a second castor wheel mounted to the second mounting bracket, and a third castor wheel mounted to the third mounting bracket, and a fourth castor wheel mounted to the fourth mounting bracket.

5. An apparatus as set forth in claim 4 wherein the first castor wheel is fixedly secured to a first mounting plate, wherein the first mounting plate is fixedly mounted to the first mounting bracket positioned therebelow, and the second castor wheel is mounted to a second mounting plate fixedly mounted below the second mounting bracket, and the third castor wheel fixedly mounted to a third mounting plate, the third mounting plate fixedly mounted below the third mounting bracket, and a fourth castor wheel fixedly mounted to a fourth mounting plate, the fourth mounting plate fixedly mounted below the fourth mounting plate, and each castor wheel includes a pivot axle projecting through each respective mounting plate to provide clearance for each pivot axle.

* * * * *